July 3, 1956 S. NASHNER ET AL 2,753,257
HYDROMETALLURGICAL PRODUCTION OF METALLIC POWDERS
Filed Nov 4, 1953

INVENTORS
SYDNEY NASHNER,
FELIX A. SCHAUFELBERGER,
BY
ATTORNEY though this invention may be more readily
United States Patent Office 2,753,257
Patented July 3, 1956

2,753,257

HYDROMETALLURGICAL PRODUCTION OF METALLIC POWDERS

Sydney Nashner, Fort Saskatchewan, Alberta, Canada, and Felix Alfred Schaufelberger, Stamford, Conn., assignors to Chemical Construction Corporation, New York, N. Y., a corporation of Delaware Application November 4, 1953, Serial No. 390,128

10 Claims. (Cl. 75—108)

This invention is concerned with the precipitation of non-ferrous metals from aqueous solutions of dissolved metal salts by the action of reducing gases at elevated temperature and pressure. More particularly, it relates to an improvement in such processes to obtain copper, cobalt and nickel as metal powder of more desirable physical and chemical characteristics such as size, density and purity. Still more specifically, it deals with a process of precipitating suitable seeding powder from a portion of such solutions under one set of operating conditions and using such precipitate as nuclei in treating additional portions of solution under differing conditions to obtain an improved product.

It is with the precipitation of the metals from solutions with which this invention is concerned. In the past it has been demonstrated that copper, nickel and cobalt can be precipitated with varying degrees of success from both acidic and ammoniacal solutions. However, in order to induce deposition of the metal as powder, careful control of the solutes content is required—both in initiating and in maintaining effective reduction. This degree of control is both troublesome and difficult.

It has also been shown that the use of seed metal in such processes is decidedly helpful in such cases. However, even in the combination of careful control and proper seeding it is difficult to insure prompt initiating of reduction to elemental metal and to maintain the reduction to the extent desired. It is even more difficult to avoid producing a product which is deficient in one or more of the properties of size, density, purity or extent of the yield.

There is, then, a demand in the industry which has not been yet satisfied. That demand is for a more satisfactory, commercially-feasible method both of initiating reduction and then of maintaining it under proper conditions for optimum grain growth. It is, therefore, a principal object of this invention to provide a solution to this problem. In so doing, it is a further object to devise a process adapted to treating solutions of several different metal salts to separately recover the metals.

In general, the solution to the problem has been obtained by taking advantage of a feature which in the past has been considered troublesome. Conditions which are most suitable for initiating reduction to elemental metal are not always those most desirable for maintaining precipitation to the desired degree. One set of optimum conditions is required to obtain a self-nucleating solution. Quite different conditions may be optimal for the control of grain growth. Past attempts at compromise conditions were quite unsatisfactory.

In the present invention, a process has been established in which seed powder of the proper type is prepared from a solution which is adjusted for optimum self-nucleation, in other words a solution in which the reduction is easily started. Precipitate so produced is then used as seed to initiate reduction in solution which is adjusted to different conditions, i. e., those optimum for the desired grain growth.

It is believed that the invention may be more readily discussed in conjunction with the accompanying drawings. The latter constitute simplified flow diagrams showing the essential steps in the operation and illustrating the several ways in which they can be combined. In the drawings.

Figure 1:
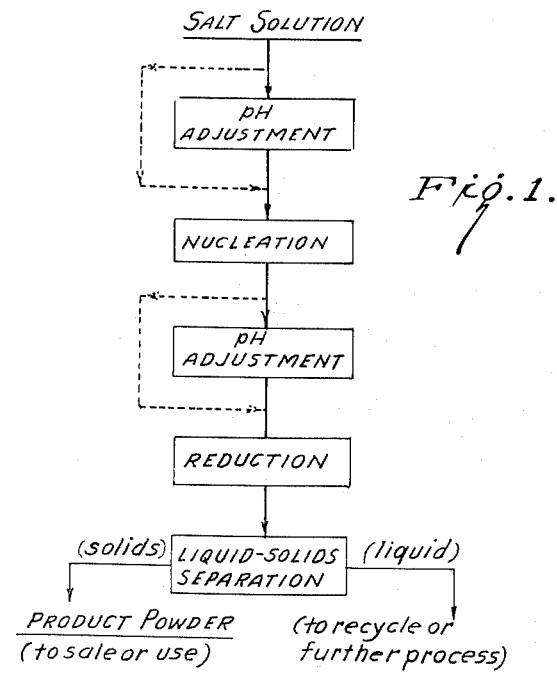
Figure 1 represents a straight-line flow which is perhaps the simplest form.

In all of the illustrative flow diagrams the starting material has been indicated to be a salt solution. In general, the specific nature or origin of the solution may be considered as independent of the steps involved in the present invention. From whatever source, an aqueous solution of soluble salts of the non-ferrous metals is obtained. Usually this solution will have been obtained by some known per se leaching operation of a suitable ore, ore concentrate, metallurgical plant by-product or secondary metals.

Actually the metals which may be treated according to the present invention may be any non-ferrous metal having an oxidation-reduction potential between those of cadmium and silver, inclusive, and which is capable of forming with ammonia a complex ion that is readily reduced to elemental metal with a suitable reducing gas. Practically, this contemplates the metals silver, mercury, copper, nickel, cobalt and cadmium. Commonly the metals principally encountered will be copper, cobalt or nickel and a discussion of these three metals will be taken as illustrative.

The non-metallic ion which goes to make up the salt may be of any inorganic acid or strong organic acid which forms a soluble salt of the metal and is not reduced under precipitation conditions. Generally these will be limited to the chlorides, acetates, sulfates and carbonates. The nitrates are good under basic conditions but are not useful under acidic reduction conditions. In actual practice, only the sulfates and carbonates are commonly encountered. The invention has its greatest applicability in the treatment of copper, nickel and cobalt sulfates and solutions of these salts will be taken as illustrative. Particularly when using ammoniacal leaching as a method of preparing the solution, it will be found that the solutions will contain varying amounts of ammonium sulfate or ammonium carbonate and it is contemplated that these materials may be present.

In obtaining the solutions to be treated according to the present invention it frequently occurs that both ferric and ferrous salts are dissolved to some extent, particularly the ferrous salts. It is assumed in the present discussion that dissolved iron has been eliminated, by some known per se method, to the desired degree or at least to a content which does not interfere with the present process.

When copper is taken up in the preparation of the salt solution, methods are also known for separating the copper salts from the other non-ferrous metal salts. Therefore, so far as the present invention is concerned, when a copper salt is to be treated it ordinarily will have been redissolved or otherwise made to comprise the principal product metal in solution.

Solutions containing only cobalt or only nickel are seldom encountered. Particularly in treating ore concentrates, a mixture of nickel and cobalt salts in solution remains after the copper and iron contents have been reduced to the desired degree. Such a solution is well suited to demonstrate the present process and will be taken illustratively for that purpose in the following discussion.

Figure 3:
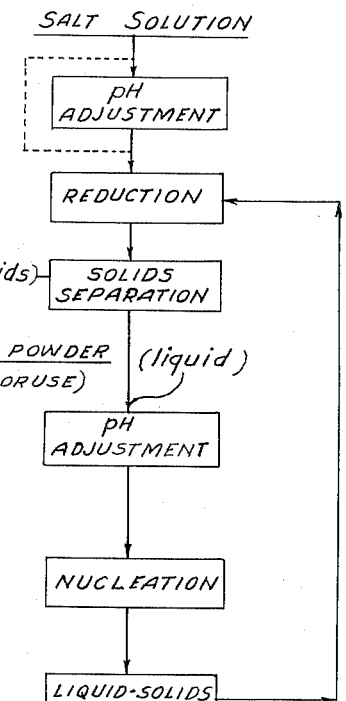
Figure 3 represents a modification of Figure 1 which is readily adapted for continuous production.
Figure 2:
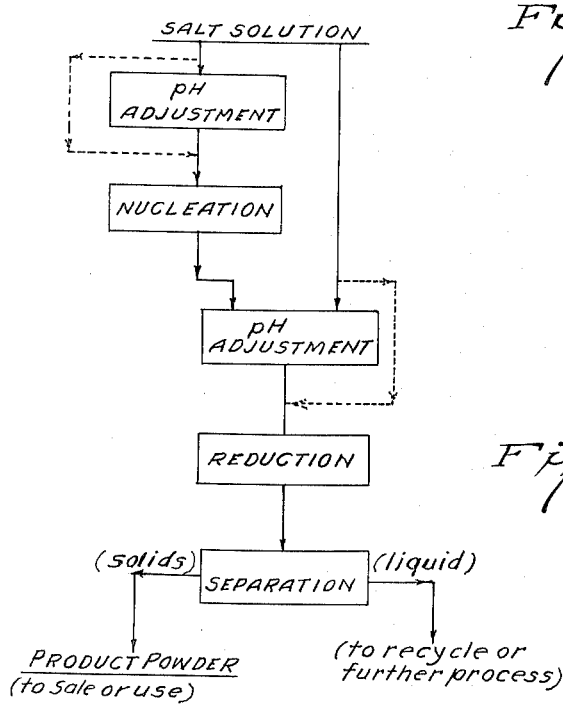
Figure 2 represents a parallel flow arrangement.

With the foregoing facts in mind, a typical feed solution for the processes diagrammed in Figures 1 to 3 may be considered as either an aqueous sulfuric acid or aqueous ammoniacal solution containing dissolved salts, illustratively sulfates, of nickel, cobalt and ammonia. Other possibilities will be discussed subsequently. Such a sulfate solution, if saturated and ammoniacal, may contain as high as 150 grams per liter of dissolved metal at ambient conditions. Acidic solutions usually run lower, about 100 grams per liter. In some cases these figures may be slightly higher, in others somewhat lower. A solution containing less than about 5–10 grams per liter is ordinarily uneconomical to treat commercially without first using some means of concentrating the solutes content. A typical solution found in practice will usually contain from about 30–70 grams per liter of combined nickel plus cobalt.

In each of the proposed flowsheets, the first step is indicated as a pH adjustment. The adjustment of the solution in the processes of Figures 1 and 2 is to an acidic content suitable for nucleation, in that of Figure 3 a content suitable for reduction. In its prior history the solution may have been incidentally brought to a proper acidic content for nucleation in Figures 1 and 2, or reduction in the case of Figure 3. If so, the initial pH adjustment may be eliminated as indicated by the dotted by-pass lines. In this discussion it will be assumed that the acid used is sulfuric. Free acid is discussed on that basis. Its equivalent may be used if so desired. Herein, the step of forming the seed powder will be referred to as nucleation, that of producing product metal as reduction.

In treating a typical ammoniacal solution containing ammonia, ammonium salt and both nickel and cobalt, a fine seed powder, well-suited for initiating nickel reduction can be prepared by conducting the nucleation step under suitable acidic conditions.

In such an operation cobalt is usually present in minor proportion. If so, it is usually desirable to precipitate the nickel while keeping the cobalt in solution for subsequent treatment. In that case, the nucleation step is carried out under acidic conditions. The free acid content of the solution after nucleation should be above that found at about pH 1.5–1.0 since at less than that found at about pH 1.8, very little cobalt will be precipitated. For each mol of nickel precipitated a mol of free acid is formed. Nickel may be precipitated at conditions ranging from basic up to about 5% free acid. However, in general the lower the terminal acidity the more complete the reduction. Further, according to the present invention, nucleation produces the best nickel and/or cobalt seed powder when done at acid conditions throughout. Depending on the solutes content then, the initial acidity may vary. If little or no cobalt is present it may be about 0.5%. It should not exceed about 5% free acid. If cobalt is to be retained, the terminal acidity usually should exceed about pH 1.5. Preferably it should not be excessively higher. If necessary, some neutralizing agent such as ammonia may be added during treatment if the liberation of acid by metal precipitation tends to make the free acid content excessive.

Nucleation and reduction are both carried out using a suitable, sulfur-free reducing gas such as carbon monoxide, hydrogen or a combination of them. In general, hydrogen is preferable, especially for densification, when it can be obtained. Both nucleation and densification or reduction are carried out at a temperature above 250° F., usually between about 300°–550° F. Higher temperatures may be used, if so desired. At least sufficient total pressure including the reducing gas overpressure, should be used to prevent boiling of the solution at the reaction temperature. Pressures greatly in excess of this equivalent pressure are not necessary and do no particular good. They should be avoided as placing an unnecessary restriction on the apparatus requirements. For the same reason unnecessarily high temperatures should be avoided as requiring excessive pressures.

Using this practice on a solution having a nickel:cobalt mol ratio of above about 1:1, during reduction the nickel content can be brought down to about 0.5 gram per liter without producing more than about a 5% cobalt content in the nickel and usually not more than about 2%. In many cases, operation can be maintained with the cobalt content of the nickel negligible. Other than the monetary loss involved in the greater value of cobalt, there is no disadvantage in having cobalt present in the nucleation product since nickel powder, cobalt powder or mixtures of them may be successfully used as seeding material in the subsequent reduction operation.

To proceed with Figure 1, nucleated solution is passed to reduction to build on the nucleus or seed particle of precipitated elemental metal and obtain a particle of the desired size and density. In Figure 1 only a part of the dissolved metal content is deposited as the nucleating material. This may be controlled in various ways, i. e., limiting the reducing gas or the period over which heat and pressure are applied. More simply, the initial acidity is so chosen that the deposition of metal carries the acidity above the terminal 5% at which nickel reduction is very slow or stops. In general, from about 2–30%, usually about 5–20%, of the metal is precipitated during nucleation. The liquor is then adjusted to an optimum for densification. In general, it can be expected that the metals of this invention will be most desirably densified or grown on the nucleus by deposition from a basic solution.

Accordingly, as shown in Figure 1, nucleated solution is treated to a second pH adjustment. Therein, sufficient ammonia is added to the now slightly-acid, illustrative nickel and cobalt solution to convert the remaining dissolved metal to the metal ammine sulfate form. In adjusting the ammoniacal content for the densification step, it is desirable to provide from about 1.5 to about 6 mols of ammonia available for ammine formation per mol of residual dissolved metal. Preferably about a minimum of 1.8 mols per mol is used. Cobalt and nickel range to as high as six or more but in the case of copper, too high an ammonia content tends to retard the extent of the reduction. About 2.0–2.2 is better in the case of copper and should be used as about the upper limit whenever possible.

Adjusted solution is then subjected to reducing gas using the temperature and pressure conditions discussed above. In general, however, it will be found that less stringent conditions are necessary during reduction and somewhat lower temperatures than used during nucleation are quite satisfactory. In this densification step the residual dissolved nickel content can be reduced readily to about 0.5–1.0 gram per liter for a high nickel-low cobalt content solution if the terminal pH does not appreciably exceed about 1.8 as required to keep cobalt in solution. Usually about pH 1.5–1.0 is satisfactory.

At the end of the densification reduction, the vessel may be pressure-relieved and/or cooled and resultant slurry subjected to a liquid solids separation. The latter may be carried out by decantation, filtration, centrifugal separation or any mechanical equivalent. The separated solids are usually washed and dried to obtain the metal powder product.

The residual liquid, which contains the cobalt content, is then processed in some way to recover the cobalt content. In the case of solutions of the type which have been discussed, here, the cobalt content and any residual nickel content will be relatively low. Some concentrating operation is usually desirable in which the cobalt content is increased and at least some of the ammonium sulfate which was formed in neutralizing acid and in reducing the metal is also removed. Such operations for concentration and ammonium salt removal may be carried out in any desired manner which is not a critical part of the present invention.

Although in Figure 1 the treatment shown is a two-step operation in which the whole solution is first treated to precipitate nucleating metal and then treated under different conditions to densify the product by precipitating the remaining nickel, the process may be extended if so desired. Rather than passing slurry from the reduction stage to the solids separation step, the slurry itself may be used to seed additional salt solution in two or more stages. On the other hand, powder may be separated from the slurry and the powder itself used for seeding additional salt solution. Depending upon the solute conditions in the solution to be treated, as many as twelve or more treatments may be done before it is necessary to form additional nucleating material and start over. It is believed, however, that the operation of such a flow is obvious from the diagram in Figure 1.

While the flow in the diagram of Figure 1 is entirely operable, it is not always suitable. It requires two adjustments of the acidic content of the entire solution. A flowscheme which avoids this difficulty is shown in Figure 2.

As shown in Figure 2, the salt solution is treated in two parallel flows. A relatively small flow is adjusted in acidity, if necessary, and subjected to a nucleation treatment as discussed above. Resultant slurry together with a relatively larger flow is then adjusted in acidity with ammonia and subjected to the reduction or densification operation. If so desired, as discussed above, a series of reduction operations may be employed. After the reduction step, the slurry is subjected to a solids separation step, product powder being recovered and filtrate being further processed as discussed above.

In each case nucleation will be carried out at one range of pH's and reduction under another range or set of conditions. It is quite possible, depending upon the order in which the steps are carried out, that the original salt solution has approximately the correct hydrogen ion content either for the nucleation or for the reduction step. In such cases both pH adjustments shown in the main flow may not be necessary. Therefore either may be by-passed as shown in the drawing.

This type of flow is particularly advantageous when the main body of salt solution is at approximately the correct pH for the reduction or densification operation. Only the relatively small flow processed for nucleation, therefore, must be subjected to complete acidic adjustment. Particularly when ammoniacal liquors form the original solution, it is undesirable to neutralize any more ammonia than occurs from the liberation of acid in precipitating the elemental metal. This type of flow is highly useful.

A modification of this flow in which only a part of the liquor is subjected to the complete acidic adjustment usually needed for nucleation is shown in Figure 3. Again, its particular utility is most suited for overall operation when the feed salt solution is close to the correct initial pH conditions for the reduction step.

As shown in Figure 3 the main body of solution is given whatever adjustment in pH is necessary for the densification and subjected to a reduction operation. In the initial start-up, this can be nucleated with nuclear seed or slurry which has been separately prepared. After the first cycle this is taken care of automatically as will be seen.

Some 60–98% of the dissolved metal content is reduced to elemental metal in the reduction step. Resultant slurry is subjected to a solids liquid separation from which powder metal product is recovered. The filtrate is adjusted to the optimum pH for nucleation and subjected to the latter treatment. Slurry from this operation is shown as subjected to a liquid solid separation. Resultant solids are used as seed powder in subsequent reduction steps. In this as in other flows, it is obviously unnecessary that the seed from nucleation be freed of liquor. Filtrate is variously treated depending upon its content in the same manner as discussed above.

One additional difference in the flow of Figure 3 over those of Figures 1 and 2 might be noted. In Figure 1 and Figure 2 the slurry containing the nuclear seed is directly treated without separating the seed. In the flow of Figure 3 the seed powder is separated out and recycled, usually as wet metal powder.

One additional possibility in operation is believed to have been made apparent by the foregoing discussion. The product powder from a single reduction step may not be in the optimum physical condition or size. Accordingly, in the flows of any of Figures 1, 2 and 3 the product powder may be used as seed in conducting further reduction steps. These do not enter into or complicate the nucleating flow schedule. As pointed out above, as many as six or more reduction operations may be used before it is necessary to renucleate in order to avoid excessive plating on the walls of the reduction vessel and other difficulties which harassed previous attempts to operate this process. Essentially the successive reduction steps not only increase the size of the product powder but result in densifying it. It is for this reason that the reduction steps are also frequently referred to as densification steps.

It is believed that the operation of the process may be further illustrated in conjunction with the following examples. These are intended as illustrative only. All parts are by weight unless otherwise noted. In these examples, the abbreviations g./l. and M./l. are used to represent grams per liter and mols per liter respectively; p. s. i. g. represents pounds per square inch gauge; where free acid is mentioned, it is expressed in terms of equivalents of sulfuric acid; and where "free" or "ammine" ammonia is mentioned it refers to ammonia and ammonium ions in stoichiometric excess over the sulfate or carbonate ions which are present per se or as dissolved ammonium or metal salts.

*Example 1*

To illustrate the process of the present invention in the precipitation of a single dissolved metal, an aqueous nickel sulfate liquor containing about 45 grams of nickel per liter is acidified with $H_2SO_4$ to a pH of about 1.7 and pumped into and through an autoclave, heated to about 450° F. and pressurized to about 750 p. s. i. g. total pressure with hydrogen, at a rate to provide a residence time of about one hour when the pH is stabilized at about 1.4–1.5. In the reduction stage, so-nucleated solution is pumped into and through a hydrogen pressurized autoclave at about 450° F. and 750 p. s. i. g. total pressure with 14% aqua ammonia at rates to provide a residence time of about 30 minutes and about 1.8 mols $NH_3$ per mol of nickel. Exit slurry is found to have a substantially constant pH and after solids removal, the liquor is substantially stripped of nickel and at a pH of about 1.5.

*Example 2*

To illustrate the selective separation of nickel from cobalt process used prior to the present invention, an ammoniacal leach liquor containing about 45 g./l. of nickel, 5 g./l. of cobalt and about 2 g./l. of calcium sulfate is treated in the following way. A sample of solution is charged to an autoclave and reduced for two hours at about 425° F. (average) under pressure brought to about 800 p. s. i. g. with hydrogen. The initial solution pH is about 6.7 and sufficient 14% aqua ammonia is pumped in to maintain a pH below about 2.0. At the end of the period the vessel is pressure relieved and cooled. Nickel is obtained as a powder having a nickel to cobalt ratio of about 285 to one. Filtrate after powder removal has a cobalt to nickel ratio of about 8:1. Apparent powder density is about 1.5. It is very bulky and difficult to wash.

Example 3

To illustrate the process of the present invention, in continuous reduction, a sample of the liquor of Example 2 is continuously nucleated by pumping through an autoclave at about 450° F., using hydrogen to a total pressure of about 750 p. s. i. g., and 30 minutes residence time. Initial pH is about 1.7 and terminal pH about 1.5. So-nucleated slurry is pH adjusted using about 7.5 ml. of 14% aqua ammonia per liter of slurry, and subjected to continuous reduction at about 750 p. s. i. g. total pressure, using hydrogen, temperatures of from about 430° F., and residence times of 30–40 minutes. Terminal pH conditions varied from about pH 1.2–1.5. About 80% reduction is obtained in continuous runs with a nickel/cobalt ratio in the product powder of about 325 to one. Average apparent powder density is about 3.65, a dense powder that is very easy to handle.

Examples 1 and 3 illustrate continuous processing, carried out using the general flow scheme of Figure 1. To illustrate the procedure shown in Figure 2, the following example may be taken as illustrative. In it, more complete reduction is obtainable due to batch treatment. It is found that continuous reductions tend to come to equilibrium before complete nickel precipitation. Complete reduction requires more than one staging.

Example 4

Additional samples of the leach liquor of Example 2 are nucleated according to the procedure therein. Nucleated liquor as produced is pH adjusted to about 6.7 to avoid metal dissolution by the free acid on standing. Samples of the leach liquor at about pH 8.5 are combined therewith at about 7.5:1 proportions and subjected to batch reduction using hydrogen, a total pressure of about 800 p. s. i. g. and temperatures of about 400°–450° F. in different runs. Runs are continued until precipitation of metal substantially ceases. Time required varied from about one hour at the lower temperature to about 20 minutes at the higher. Apparent densities of from about 3.3 to about 4 are easily obtained. The longer periods at lower temperatures are found to promote higher densities. Metal product purity is found to vary from about 99.3–99.9% nickel plus cobalt. It is found that from such liquors, powder is easily produced at densities above 3.0 and having nickel to cobalt ratios about 200 to one while producing a cobalt to nickel ratio in the filtrate of from 12–30 to one. At less favorable filtrate ratios powder is produced having nickel to cobalt ratios of 400–1000 to one without sacrifice of product quality.

To illustrate the advantages of the present invention in continuous selective reduction of cobalt from nickel, the following examples may be taken as illustrative. In the first, an attempt is made to convert a known batch operation procedure to continuous operation simply by continuous feeding and discharge. In the succeeding example the procedure of the present invention is introduced.

Example 5

To sulfuric acid leach liquor containing about 45 g./l. of cobalt and 9 g./l. of nickel is added about 3 M./l. of NH₃ per mol of cobalt and solution is pumped through an autoclave at about 400°–450° F. under a total pressure maintained at about 700–750 p. s. i. g. with hydrogen. For retention periods up to about one hour little or no reduction is initiated. Seed powder is then introduced and reduction is found to occur only until growth of the powder makes it too large to remain readily suspended or serve as nuclei. Little or no additional nucleation is found to occur. Both extent of reduction and particle properties of resultant metal spheres is poor.

Example 6

In succeeding tests additional samples of the leach liquor of Example 5 are adjusted with ammonia to maintain terminal acidity at from about pH 1.8 to about 3 in the autoclave and then batch nucleated for about 30 minutes at about 425° F. and 700–750 p. s. i. g. total pressure using hydrogen. About 0.25 to 1.0 g./l. of nuclear seed powder is produced in different runs. Following the procedure of Figure 1, so-nucleated solution is adjusted with ammonia to produce about 3–3.5 mols of NH₃ per mol of dissolved metal and batch reduced at slightly lower temperatures and pressures using reduction periods of 20 minutes to about one hour. Product powder is of good physical properties and satisfactory in cobalt plus nickel purity.

Example 7

Several samples of reduced slurry obtained by the procedure of Example 6, containing from about 7–10 gms./l. of dissolved cobalt, 45–50 gms./l. of cobalt powder and about 100–110 gms./l. of ammonium sulfate are adjusted to a pH of about 9 with ammonia and subjected to a second reduction under similar temperatures and pressures. Dissolved cobalt contents are reduced to about one g./l. or less in retention times of 15–30 minutes.

Example 8

An ammoniacal leach liquor containing about 74 g./l. of nickel, 2 g./l. of cobalt and about 4 M./l. of ammonia is combined with about 20 g./l. of previously nucleated seed powder and reduced continuously at about 450° F. under a pressure of about 900 p. s. i. g. maintained with hydrogen and about 73–74 gms./l. of product nickel powder is deposited and collected. Resultant liquor containing about 20 gms./l. of dissolved nickel and 2 gms./l. of cobalt is flash cooled to remove excess ammonia and neutralized to a pH of about 1.7 with aqueous sulfuric acid. Resultant adjusted solution is reduced at about 400° F. and 900 p. s. i. g. pressure using hydrogen to a resultant pH of about 1.4–1.5 and a dissolved nickel and cobalt content of about 0.5 and 2.0 g./l. respectively, 10–15 g./l. of free acid and a high concentration of ammonium sulfate. Resultant slurry is pressure relieved and cooled and precipitated nickel is collected and recycled as seed to the reduction operation. In continued operation, substantially cobalt-free nickel of good physical properties is produced in continuous operation.

Example 9

A seed powder is prepared by treating an aqueous acidic solution (pH 2) containing 0.5 M./l. at 425° F., under about 200 p. s. i. partial pressure of hydrogen for one hour. Substantially quantitative reduction is obtained, producing about 0.5 mol of free H₂SO₄ and 31.5 g. of copper powder. Powder is collected, washed with water and immediately used in a densification step on an aqueous ammoniacal solution containing 1 M./l. copper sulfate, 0.3 M./l. zinc sulfate, 1.5 M./l. ammonium sulfate and 5.2 M./l. of free ammonia. Treatment is conducted for about one hour at about 375° F. under about 300 p. s. i. partial pressure of hydrogen. At the end of this period about 80% of the copper content is precipitated as zinc-free metal on the seed powder. The remaining solution, containing additional copper and the zinc, is sent to a copper-zinc separation circuit.

Example 10

An aqueous ammoniacal solution containing about 0.5 M./l. of copper sulfate, 1 M./l. of ammonium sulfate and 0.8 M./l. of free ammonia is treated at about 375° F. under about 300 p. s. i. partial pressure of hydrogen. Quantitative reduction of dissolved copper to fine metal powder is obtained in about one hour, the residual solution containing about 1% free sulfuric acid. This powder is used to seed another portion of the more strongly ammoniacal copper-zinc liquor treated in Example 9. About 78% of the dissolved copper is precipitated on the seed powder in zinc-free condition. Product powder is in good physical condition.

The embodiments of the invention in which an exclusive property or privilege is claimed are defined as follows:

1. In chemical precipitation of elemental metal powder, with concomitant liberation of acid, from aqueous solutions of salts of an inorganic acid and at least one non-ferrous metal of interest selected from the group consisting of cadmium, cobalt, copper, nickel and silver, by reduction with a non-sulfidizing reducing gas at elevated temperatures and superatmospheric pressure; the method of improving the properties of so-precipitated metal powder which comprises: subjecting such solution containing dissolved salt of the metal of interest to a nucleation reduction in which a part of the dissolved metal of interest is reduced to a fine seeding metal precipitate under one set of reducing conditions and using precipitate so-obtained as seeding material in a densification reduction carried out under different reducing conditions; said nucleation reduction being carried out by, providing in said solution a hydrogen ion concentration below that limiting concentration at which reduction of the metal of interest ceases, applying said one set of reducing conditions to said solution without seeding, whereby dissolved metal of interest is precipitated as fine nuclear seed powder, maintaining said reducing conditions until a minor proportion of the dissolved metal of interest is precipitated and then stopping said nucleation reduction; and said densification reduction being carried out by applying reducing conditions to a slurry of said seed powder in a solution of dissolved salt of the metal of interest, said slurry having an initial hydrogen ion concentration which is (a) lower than that at which nucleation reduction was initiated and (b) at which nucleation without seeding is impracticable but (c) reduction proceeds readily in the presence of said seed powder; maintaining said slurry under reducing conditions, whereby reduction proceeds by metal deposition on said seed powder with further liberation of acid; provding in said slurry sufficient neutralizing agent to prevent said further liberation from producing said limiting hydrogen ion concentration before reduction is sufficiently complete, and continuing said conditions until reduction is sufficiently complete.

2. A process according to claim 1 in which said nucleation reduction is stopped by initiating nucleation at a preselected hydrogen ion concentration that will be increased to said limiting concentration by acid liberated by reduction of a minor proportion of the dissolved metal content.

3. A process according to claim 1 in which neutralizing agent is also provided during said nucleation reduction until the precipitation of seed powder is sufficiently complete.

4. A process according to claim 1 in which said slurry treated in the densification reduction is a mixture of residual slurry after said nucleation reduction and additional solution.

5. A process according to claim 1 in which said slurry treated in the densification reduction is a mixture of unreduced solution and seed powder produced in the nucleation reduction.

6. A process according to claim 5 in which said seed powder is produced by a nucleation treatment of residual liquor after removing solids precipitated in a previous densification reduction.

7. In the chemical precipitation of elemental nickel with concomitant liberation of acid from a solution comprising dissolved nickel sulfate by the action of a non-sulfidizing reducing gas at elevated temperature and superatmospheric pressure; the combination therewith of the method of densifying precipitated nickel powder which comprises the steps of: subjecting solution to a nucleation reduction initiated in an aqueous acidic solution having an acid concentration below about 5.0% free acid and stopping said reduction after precipitating a minor proportion of the nickel; then carrying out densification reduction by applying reducing conditions to a slurry comprising resultant precipitated metal in a solution comprising nickel sulfate and having an initial hydrogen ion concentration lower than about that at pH 6.7 and at which nickel precipitation is readily accomplished, continuing said conditions whereby reduction occurs by deposition of nickel on the seed powder with further liberation of acid, providing during said densification reduction sufficient ammonia to keep the free acid concentration below about 5.0%, maintaining reducing temperature conditions and an acid content below about 5.0% free sulfuric acid until nickel reduction substantially ceases and collecting resultant nickel powder.

8. A process according to claim 7 in which the initial solution comprises both nickel and cobalt sulfates and said nucleation reduction is initiated and carried out at hydrogen ion concentrations between those found at about pH 1.5 and about 1.5% free acid, and said densification reduction is initiated at a hydrogen ion concentration lower than at about pH 1.8 but terminated above that at about pH 1.5.

9. In the chemical precipitation of elemental nickel with concomitant liberation of sulfuric acid from a solution comprising dissolved nickel sulfate by the action of a non-sulfidizing reducing gas at elevated temperature and pressure; the combination therewith of the method of densifying precipitated nickel which comprises the steps of: first, subjecting solution to a nucleation reduction initiated at an acid concentration between that for a pH of about 6.7 and 5.0% free sulfuric acid and stopping reduction after precipitating only a minor proportion of the original nickel content as fine nuclear seed; then providing in a slurry comprising said seed in a solution comprising nickel sulfate, sufficient ammonia to produce a basic pH and convert dissolved nickel to a nickel ammine; subjecting said resultant slurry to densification reduction with said reducing gas, whereby reduction occurs by deposition of nickel on said seed with further liberation of sulfuric acid; maintaining said reducing conditions and providing any necessary ammonia to keep the free sulfuric acid concentration below about 1.5% until nickel reduction is sufficiently complete; terminating said reduction at a sulfuric acid concentration between those at about pH 1.5 and about 5.0% free acid and collecting resultant dense, discrete nickel metal powder.

10. A process according to claim 9 in which the initial solution comprises both nickel and cobalt sulfates and said nucleation reduction is initiated and carried out at acid concentrations greater than that at about pH 1.8.

References Cited in the file of this patent

UNITED STATES PATENTS

| | | |
|---|---|---|
| 924,077 | Jamau | June 8, 1909 |
| 1,426,517 | Sulzberger | Aug. 22, 1922 |
| 1,467,202 | Slatimeanu | Sept. 4, 1923 |
| 1,686,391 | Muller et al. | Oct. 2, 1928 |
| 1,783,662 | Marx et al. | Dec. 2, 1930 |
| 2,647,831 | Allen et al. | Aug. 4, 1953 |
| 2,647,832 | Allen et al. | Aug. 4, 1953 |

FOREIGN PATENTS

| | | |
|---|---|---|
| 101,339 | Great Britain | Dec. 28, 1916 |
| 296,814 | Great Britain | Sept. 10, 1928 |
| 458,959 | Great Britain | Dec. 30, 1936 |